United States Patent
Kim et al.

(10) Patent No.: US 10,231,241 B2
(45) Date of Patent: Mar. 12, 2019

(54) METHOD AND DEVICE FOR TRANSMITTING TRAINING SYMBOL FOR ESTIMATING ANALOG BEAM IN WIRELESS ACCESS SYSTEM WHICH SUPPORTS HYBRID BEAMFORMING

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 15/504,896

(22) PCT Filed: Aug. 21, 2015

(86) PCT No.: PCT/KR2015/008742
§ 371 (c)(1),
(2) Date: Feb. 17, 2017

(87) PCT Pub. No.: WO2016/028111
PCT Pub. Date: Feb. 25, 2016

(65) Prior Publication Data
US 2017/0273063 A1    Sep. 21, 2017

Related U.S. Application Data

(60) Provisional application No. 62/039,909, filed on Aug. 21, 2014.

(51) Int. Cl.
*H04W 72/04* (2009.01)
*H04L 1/18* (2006.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS

2012/0307726 A1    12/2012   Pi et al.
2013/0039445 A1*   2/2013    Hwang ............... H04B 7/0617
                                                              375/316
(Continued)

FOREIGN PATENT DOCUMENTS

KR    10-2013-0028397 A    3/2013
KR    10-2014-0043532 A    4/2014

*Primary Examiner* — George C Atkins
(74) *Attorney, Agent, or Firm* — Birch, Stewart, Kolasch & Birch, LLP

(57) ABSTRACT

The present invention relates to a method and a device for transmitting a training symbol for hybrid beamforming. A method for transmitting a training symbol for estimating an analog beam in a wireless access system which supports hybrid beamforming according to one embodiment of the present invention comprises: a step of repeatedly transmitting a training symbol a number of times equivalent to the number of analog candidate beams; and a step of repeatedly transmitting a broadcasting channel a number of times equivalent to the number of analog candidate beams. A training symbol section, where the training symbol is transmitted, can be allocated to the same subframe as a subframe to which the repeatedly transmitted broadcasting channel is allocated.

12 Claims, 12 Drawing Sheets

(51) Int. Cl.
  *H04B 7/06* (2006.01)
  *H04W 72/00* (2009.01)
  *H04L 5/00* (2006.01)
  H04W 88/02 (2009.01)
  H04W 88/08 (2009.01)

(52) U.S. Cl.
  CPC ............ *H04L 1/1812* (2013.01); *H04L 5/005* (2013.01); *H04L 5/0053* (2013.01); *H04W 72/005* (2013.01); *H04W 72/0446* (2013.01); *H04L 5/0005* (2013.01); *H04W 88/02* (2013.01); *H04W 88/08* (2013.01)

(56) References Cited

U.S. PATENT DOCUMENTS

| | | | |
|---|---|---|---|
| 2013/0064239 A1* | 3/2013 | Yu | H04W 72/046 370/350 |
| 2013/0122820 A1* | 5/2013 | Horio | H04B 17/00 455/67 |
| 2013/0242968 A1 | 9/2013 | Zhang et al. | |
| 2014/0003481 A1 | 1/2014 | Keusgen et al. | |
| 2014/0112220 A1 | 4/2014 | Kwak et al. | |
| 2014/0128109 A1* | 5/2014 | Li | H04W 68/02 455/458 |
| 2014/0204851 A1 | 7/2014 | Chen et al. | |
| 2014/0323144 A1* | 10/2014 | Kim | H04B 7/0617 455/452.1 |
| 2017/0141466 A1* | 5/2017 | Hong | H01Q 5/28 |
| 2017/0311324 A1* | 10/2017 | Jung | H04B 7/0617 |

\* cited by examiner (a)

(b)

$T_i$ : Training symbol transmitted on analog beam #i
$BCH_i$ : BCH symbols transmitted on analog beam #i

FIG. 14

| Training sequence time domain repetition pattern | Analog beam pattern | Total number of training symbols (preamble period) |
|---|---|---|
| OFDM symbol duration ($1/\Delta f$), OFDM symbol #0 | | 1 symbol |
| OFDM symbol duration ($1/\Delta f$), OFDM symbol #0 | | 2 symbols |
| OFDM symbol duration ($1/\Delta f$), OFDM symbol #0 | | 4 symbols |
| ... | ... | ... |

METHOD AND DEVICE FOR TRANSMITTING TRAINING SYMBOL FOR ESTIMATING ANALOG BEAM IN WIRELESS ACCESS SYSTEM WHICH SUPPORTS HYBRID BEAMFORMING

CROSS REFERENCE TO RELATED APPLICATIONS

This application is the National Phase of PCT International Application No. PCT/KR2015/008742, filed on Aug. 21, 2015, which claims priority under 35 U.S.C. 119(e) to U.S. Provisional Application No. 62/039,909, filed on Aug. 21, 2014, all of which are hereby expressly incorporated by reference into the present application.

TECHNICAL FIELD

The present invention relates to a radio access system supporting hybrid beamforming and, more particularly, to a method and apparatus for transmitting a training symbol for estimating an analog beam.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

A hybrid beamformer basically operates by a combination of analog beamforming and digital beamforming. At this time, since transmission regions of an analog beam and a digital beam are restricted to specific regions, multi-rank support and multiuser support are restricted. In particular, in a hybrid beaformer, due to restriction on the transmission range of an analog beam, it is difficult to simultaneously transmit a broadcast channel (or a broadcast signal) to a plurality of user equipments (UEs).

The present invention provides various methods for solving such a problem.

An object of the present invention is to provide a method of designing, allocating and transmitting a training symbol (or a preamble) for analog beam scanning used for hybrid beamforming.

Another object of the present invention is to provide a method of transmitting a broadcast channel associated with a training symbol section for hybrid beamforming.

Another object of the present invention is to provide a method of acquiring synchronization using a training symbol designed for analog beam scanning.

Another object of the present invention is to provide a method applicable to both a hybrid beamforming method and a digital beamforming method.

Another object of the present invention is to provide apparatuses supporting such methods.

The technical problems solved by the present invention are not limited to the above technical problems and other technical problems which are not described herein will become apparent to those skilled in the art from the following description.

Technical Solution

The present invention provides a method and apparatus for transmitting a training symbol for hybrid beamforming. To this end, the present invention provides a method of allocating a training symbol section, a method of setting an allocation period, a method of associating a training symbol section with a broadcast signal and a method of acquiring synchronization using a training symbol.

According to an aspect of the present invention, a method of transmitting a training symbol for estimating an analog beam in a radio access system supporting hybrid beamforming includes repeatedly transmitting the training symbol by the number of analog candidate beams, and repeatedly transmitting a broadcast channel by the number of analog candidate beams. A training symbol section in which the training symbol is transmitted is allocated to the same subframe as a subframe to which the repeatedly transmitted broadcast channel is allocated.

According to another aspect of the present invention, an apparatus for transmitting a training symbol for estimating an analog beam in a radio access system supporting hybrid beamforming includes a transmitter and a processor configured to generate and transmit the training symbol. The processor is configured to control the transmitter to repeatedly transmit the training symbol by the number of analog candidate beams and to control the transmitter to repeatedly transmit a broadcast channel by the number of analog candidate beams. A training symbol section in which the training symbol is transmitted is allocated to the same subframe as a subframe to which the repeatedly transmitted broadcast channel is allocated.

The repeatedly transmitted training symbols may be mapped to different analog beams.

The training symbol section may be allocated to a symbol located just before a region, to which the broadcast channel is allocated.

The training symbol section may be allocated to a region located after a region, to which the broadcast channel is allocated, and allocated to a symbol located closest to a region, to which the broadcast channel is allocated, except for a symbol region, to which a cell-specific signal is allocated, in the subframe.

The repeatedly transmitted broadcast channels may include the same system information, and different analog beams may be scrambled and transmitted.

An identifier and/or an information on beam width of the analog beam may be set according to a repetition pattern of the training symbol.

The aspects of the present invention are only a part of the preferred embodiments of the present invention, and various embodiments based on technical features of the present invention may be devised and understood by the person having ordinary skill in the art based on the detailed description of the present invention.

Advantageous Effects

As is apparent from the above description, the embodiments of the present invention have the following effects.

First, it is possible to design, allocate and transmit a training symbol (or a preamble) for analog beam scanning used for hybrid beamforming.

Second, by transmitting a broadcast channel in association with a training symbol section for hybrid beamforming, it is possible to efficiently transmit the broadcast channel to a UE based on analog beam information detected through analog beam estimation.

Third, the UE can acquire synchronization with an eNB using a training symbol designed for analog beam scanning without a separate synchronization signal.

It will be appreciated by persons skilled in the art that the effects that can be achieved through the embodiments of the present invention are not limited to the above-described effects and other effects which are not described herein will be derived and understood from the above description of the embodiments of the present invention. That is, it will be appreciated by persons skilled in the art that the unintended effects that can be achieved by implementing the present invention may be derived from the embodiments of the present invention.

DESCRIPTION OF DRAWINGS

The accompanying drawings, which are included to provide a further understanding of the invention, illustrate embodiments of the invention and together with the description serve to explain the principle of the invention.

FIG. 14 is a diagram illustrating a relation between a training sequence repetition pattern and an analog beam pattern.

BEST MODE

Figure 1:
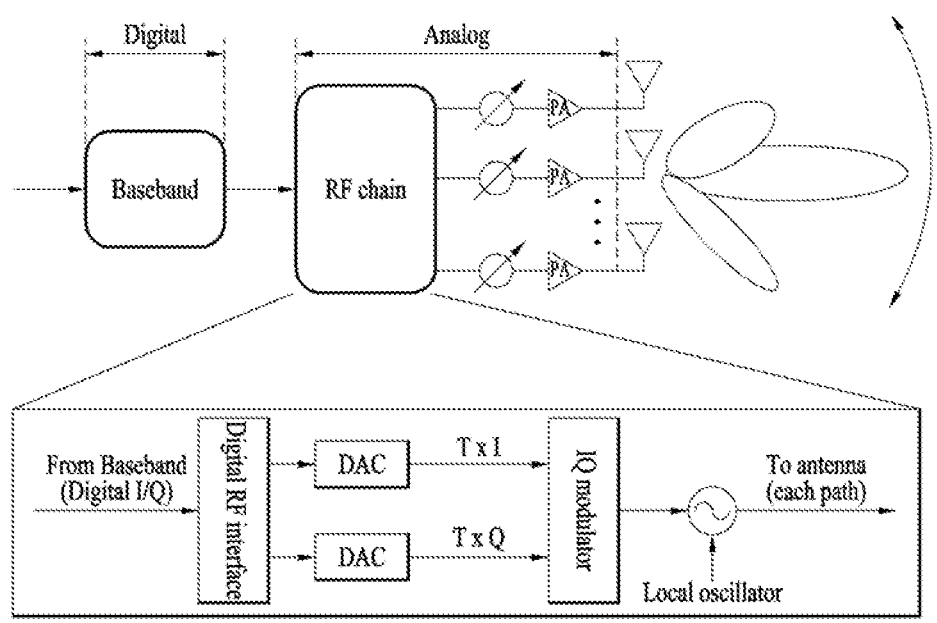
FIG. 1 is a block diagram showing a transmitter including an analog beamformer and a radio frequency (RF) chain.

The below-described embodiments of the present invention relate to methods and apparatuses for transmitting a training symbol for estimating an analog beam in a radio access system supporting hybrid beamforming.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical idea and scope of the present disclosure.

Hereinafter, 3GPP LTE/LTE-A system which is one of examples of wireless access systems which are used in the embodiments of the present invention.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. Hybrid Beamforming 1.1 Analog Beamforming Technology and Digital Beamforming Technology Existing beamforming technology using multiple antennas may be roughly divided into analog beamforming technology and digital beamforming technology according to location, to which a beamforming weight vector/precoding vector is applied.

FIG. 1 is a block diagram showing a transmitter including an analog beamformer and a radio frequency (RF) chain.

First, the analog beamforming method is a representative beamforming method applied to an initial multi-antenna structure, which divides an analog signal subjected to digital signal processing into a plurality of paths and performs beamforming through a phase shifter (PS) and a power amplifier (PA) of each path. As shown in FIG. 1, for analog beamforming, an analog signal derived from a single digital signal needs to be processed by a PA and a PS connected to each antenna. That is, in an analog stage, a complex weight is processed by the PS and the PA. Here, a radio frequency (RF) chain means a processing block for converting a baseband (BB) signal into an analog signal and the configuration thereof is shown in FIG. 2.

In the analog beamforming method, beamforming accuracy is determined according to device characteristics of the PS and the PA. In addition, the analog beamforming method is suitable for narrowband transmission due to control characteristics of the devices. In contrast, due to a hardware structure in which it is difficult to implement multiple stream transmission, multiplexing gain for increasing a transfer rate is relatively low. In addition, it is difficult to perform beamforming per user based on orthogonal resource assignment.

Figure 2:
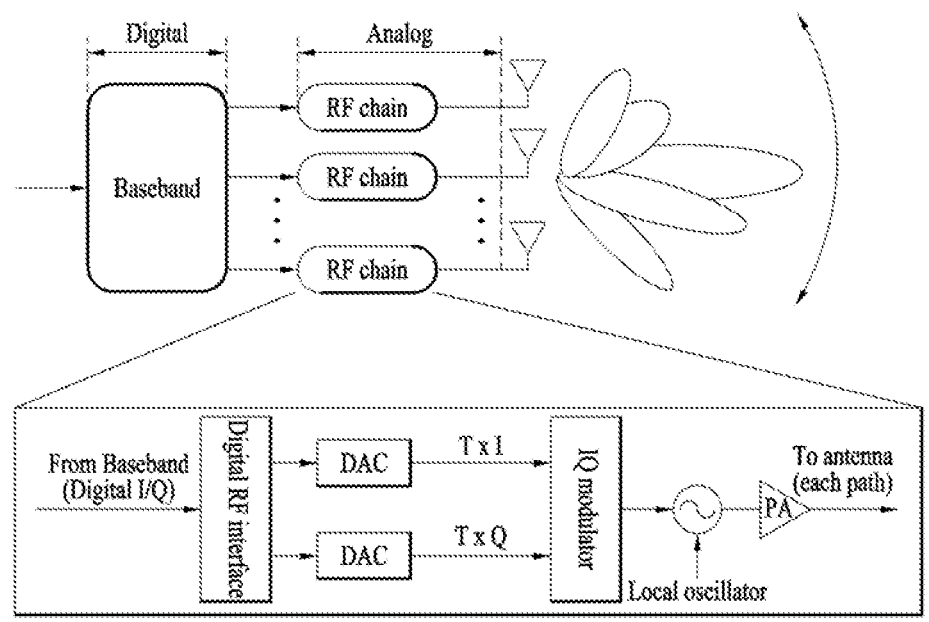
FIG. 2 is a block diagram showing a transmitter including a digital beamformer and a radio frequency (RF) chain.

FIG. 2 is a block diagram showing a transmitter including a digital beamformer and a radio frequency (RF) chain.

In digital beamforming, unlike analog beamforming, a transmitter performs beamforming in a digital stage using a BB process in order to maximize diversity and multiplexing gain in a multiple input multiple output (MIMO) environment. For example, as shown in FIG. 2, precoding is performed in a BB process such that beamforming is possible (here, an RF chain includes a PA), because a complex weight derived for beamforming is directly applied to transmitted data.

In addition, in the digital beamforming method, since beamforming may be differently performed per user, it is possible to support simultaneous beamforming for multiple users. Since beamforming is independently performed per user, to which orthogonal resources are assigned, scheduling flexibility is high and a transmission end suiting a system purpose can be employed. In addition, if MIMO-orthogonal frequency division multiplexing (OFDM) technology is applied in a broadband transmission environment, it is possible to form an independent beam per subcarrier. Accordingly, the digital beamforming method can optimize a maximum single user transfer rate based on enhanced beam gain and system capacity enhancement. Therefore, in a current 3G/4G system, digital beamforming based MIMO technology has been introduced.

Next, a massive MIMO environment in which the number of transmit/receive antennas is significantly increased will be described.

In general, in cellular communication, assume that a maximum number of transmit/receive antennas applied to the MIMO environment is 8. However, as massive MIMO has evolved, the number of antennas may be increased to several tens of antennas or several hundred antennas. If digital beamforming technology is applied in the massive MIMO environment, since signal processing for several hundreds of antennas for digital signal processing of a transmission end is performed through a BB process, signal processing complexity is significantly increased. In addition, since RF chains corresponding in number to the number of antennas are required, hardware implementation complexity is significantly increased.

In addition, since independent channel estimation of all antennas is required and feedback information of a massive MIMO channel including all antennas is required in a frequency division duplex (FDD) system, pilot and feedback overhead are significantly increased. In contrast, if analog beamforming technology is applied in the massive MIMO environment, hardware complexity of a transmission end is relatively low, but performance increase due to use of multiple antennas is insignificant and resource assignment flexibility is lowered. In particular, it is difficult to control a beam per frequency upon broadband transmission.

Accordingly, in the massive MIMO environment, instead of exclusively selecting only one of the analog beamforming method and the digital beamforming method, a method of configuring a hybrid transmission end which is a combination of an analog beamforming structure and a digital beamforming structure is necessary. That is, as shown in Table 1 below, using a relationship between performance gain and complexity of an analog beamforming method and a digital beamforming method, a hybrid transmission end capable of decreasing hardware implementation complexity thereof and maximizing beamforming gain using a massive antenna array needs to be designed.

TABLE 1

| | Beamforming accuracy control ease | Multi-carrier beam control | Multi-stream transmission | Hardware complexity (BB process) | Pilot and feedback overhead |
|---|---|---|---|---|---|
| Analog beamforming method | low (relationship PA/PS device characteristics) | Impossible or difficult | Impossible or difficult | Low | Low |
| Digital beamforming method | high | Possible | Possible | High | High |

1.2 Hybrid Beamforming

The purpose of hybrid beamforming is to configure a transmission end having merits of an analog beamforming method and a digital beamforming method while decreasing hardware complexity in a massive MIMO environment.

Figure 3:
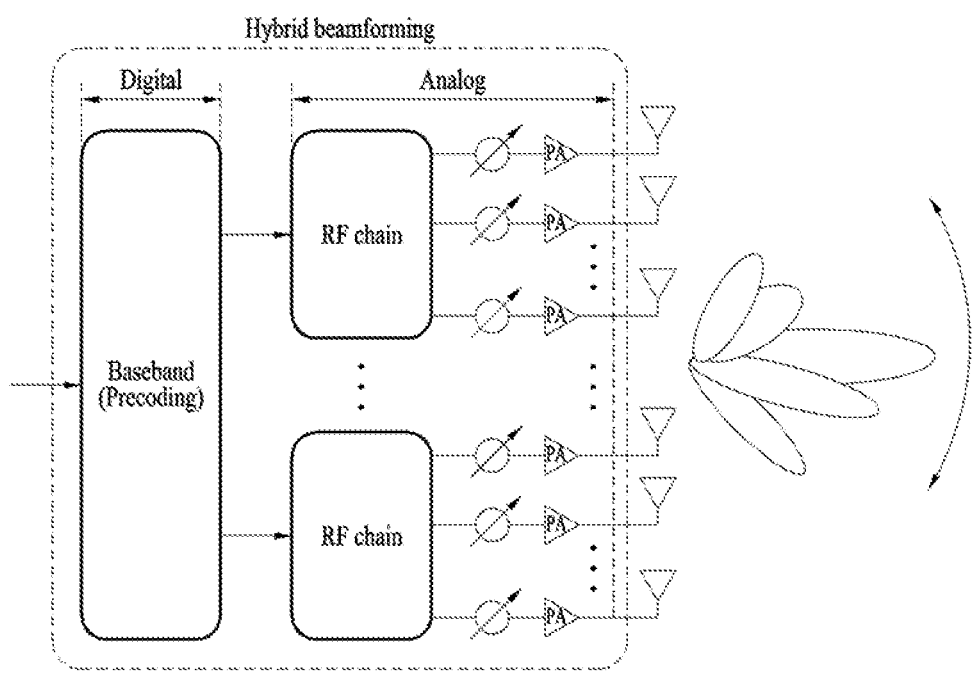
FIG. 3 is a block diagram showing a transmission end including a hybrid beamformer.

FIG. 3 is a block diagram showing a transmission end including a hybrid beamformer.

As shown in FIG. 3, a hybrid beamforming method may be configured to perform coarse beamforming using an analog beamforming method and to perform multi-stream or multi-user transmission using a digital beamforming method.

As a result, a hybrid beamforming method is obtained by simultaneously utilizing the analog beamforming method and the digital beamforming method in order to decrease implementation complexity or hardware complexity of the transmission end. Fundamentally, technical issues of the hybrid beamforming method will now be described.

(1) Difficulty in Optimization of Analog/Digital Beamforming Design

Optimization simultaneously considering analog beamforming and digital beamforming has the following difficulties. Fundamentally, a beamforming method is independently applicable per user using the same time-frequency resources in digital beamforming but a common beamforming method should be applied using the same time-frequency resources in analog beamforming. Accordingly, this restricts optimization of the number of supportable ranks, beam control flexibility and beamforming resolution.

For example, there are problems such as 1) maximum rank restriction according to the number of RF chains, 2) difficulty in subband beam control by RF beamformer and 3) beam resolution/granularity segmentation problems.

(2) Necessity of Embodying Common Signal Transmission Method

In the analog beamforming method for forming a beam only in a specific direction using the same time-frequency resources, it is impossible to simultaneously form a plurality of beams in all UE directions. Accordingly, common signals such as an uplink/downlink control channel, a reference signal (RS), a broadcast channel, a synchronous signal, etc. cannot be simultaneously transmitted to all UEs distributed in an entire area of a cell. In addition, problems may be caused in transmission of an uplink RACH channel, a sounding reference signal, a physical uplink control channel (PUCCH), etc.

(3) Necessity for Additional Pilot and Feedback Design for Analog/Digital Beamforming If analog/digital beam estimation is performed, a digital beam may use an existing orthogonal pilot assignment scheme without change but an analog beam requires a predetermined time-duration corresponding to the number of beam candidates. This means that time delay for analog beam estimation is large and complexity is significantly increased when an analog beam is estimated simultaneously with a digital beam.

For example, system loss may be caused due to increase in time delay for analog beam estimation and beam estimation complexity may be increased due to increase in combinations of analog and digital beams.

(4) Difficulty in Supporting Analog Beam Based SDMA and FDMA

In the digital beamforming method, beamforming for multi-user/stream is freely performed. However, in the analog beamforming method, since the same beamforming is performed with respect to an entire transmission band, it is difficult to independently perform beamforming per user or per stream. In particular, since it is difficult to support FDMA via orthogonal frequency resource assignment, it is difficult to optimize frequency resource efficiency.

For example, it may be difficult to support orthogonal frequency division multiple access (OFDMA) for supporting multiple access due to difficulty in independent beamforming per user in the frequency domain at the same time and to support single user-MIMO (SU-MIMO) for supporting multiple streams due to difficulty in independent beamforming per stream at the same frequency-time. In addition, it may be difficult to support multi user-MIMO (MU-MIMO) for supporting multiple users due to difficulty in independent beamforming per user at the same frequency-time In order to solve such technical issues, the embodiments of the present invention provide methods for solving analog/digital beam estimation complexity for hybrid beamforming.

1.3 Hybrid Beamforming System Model

Figure 4:
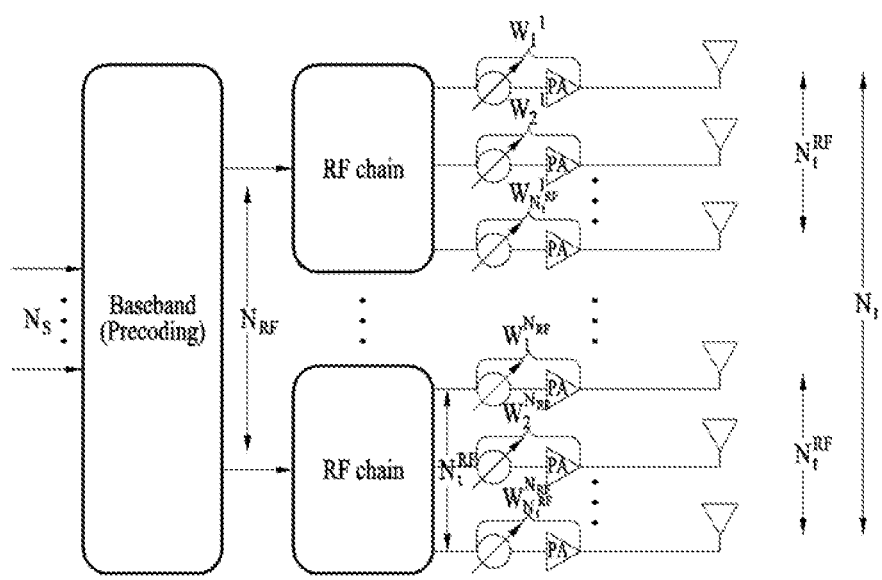
FIG. 4 is a diagram showing an example of the structure of a hybrid beamformer configured in a basic transmission end.

FIG. 4 is a diagram showing an example of the structure of a hybrid beamformer configured in a basic transmission end.

As shown in FIG. 4, a transmission end structure including only $N_t^{RF}$ independent antennas per RF chain may be assumed. Accordingly, a relationship between the total number of antennas and the number of antennas per RF chain is $N_t = N_t^{RF} \times N_{RF}$. Finally, since a signal passing through a phase shifter (PS) and a power amplifier (PA) per RF chain is independently sent to a transmit antenna, a matrix type system model shown in Equation 1 below may be derived.

$$y_k = H_k F^{RF} F_k^{BB} s_k + z^k \quad \text{[Equation 1]}$$

In Equation 1, $y_k$ denotes a received signal vector $N_r \times 1$ at a k-th subcarrier, $H_k$ denotes an $N_r \times N_t$ channel of the k-th subcarrier, $F^{RF}$ denotes an $n_t \times N_{RF}$ RF precoder equally configured in all subcarriers, and $F_k^{BB}$ denotes an $N_{RF} \times N_S$ baseband precoder at the k-th subcarrier, which is changeable according to subcarrier. In addition, $s_k$ denotes a transmitted signal vector $N_S \times 1$ at the k-th subcarrier and $z_k$ denotes a noise signal vector $N_r \times 1$ at the k-th subcarrier.

At this time, k denotes a subcarrier index (k=0, 1, 2, ..., $N_{FFT}-1$), $N_{FFT}$ denotes the total number of subcarriers as a Fast Fourier Transform (TTF) size and $N_{RF}$ denotes the total number of RF chains.

In addition, $N_t$ denotes the total number of antennas of the transmission end, $N_t^{RF}$ denotes the number of transmit antennas included per RF chain, $N_r$ denotes the total number of antennas of the reception end, and $N_s$ denotes the number of streams of transmitted data.

At this time, Equation 2 below may be obtained by solving Equation 1 with respect to a subcarrier k.

$$\begin{bmatrix} y^{(1)} \\ \vdots \\ y^{(N_r)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \quad \text{[Equation 2]}$$

$$F^{RF} \left( \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(Nr)} \end{bmatrix}$$

In Equation 2, an analog beamforming equivalent precoding matrix $F^{RF}$ ($N_t \times N_{RF}$ matrix) obtained by a phase shifter and PA for changing the phase of a beam after an RF chain may be defined as shown in Equation 3 below.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \quad \text{[Equation 3]}$$

In addition, a precoding weight per RF chain of the RF precoding matrix $F^{RF}$ may be defined as shown in Equation 4 below.

$$w^j_{N_t^{RF}} = \begin{bmatrix} w^j_1 \\ w^j_2 \\ \vdots \\ w^j_{N_t^{RF}} \end{bmatrix} \quad \text{[Equation 4]}$$

Figure 5:
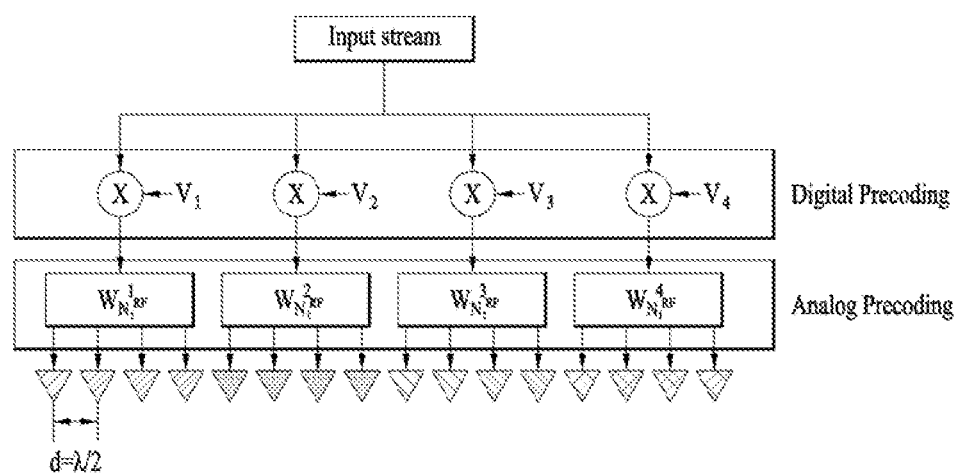
FIG. 5 is a diagram showing a 16-ULA antenna structure including four RF chains.

1.4 Beam Radiation Pattern of Hybrid Beamformer (BF) for Uniform Linear Array (ULA) Antenna FIG. 5 is a diagram showing a 16-ULA antenna structure including four RF chains.

An array response vector of a ULA antenna may be defined as shown in Equation 5 below.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots & \exp\left(j2\pi \times (N_t-1) \times \frac{d}{\lambda}\sin(\theta)\right) \end{bmatrix}^T \quad \text{[Equation 5]}$$

where, $\lambda$ denotes a wavelength and d denotes a distance between antennas. In order to indicate the antenna radiation pattern of the hybrid beamformer, for convenience, assume that the number of RF chains is 4 and the number of analog antennas per RF chain is 4. Such a beamformer is shown in FIG. 5. At this time, the total number of transmit antennas is 16 and the distance between antennas is $d=\lambda/2$.

At this time, the PS and the PA of the analog terminal may be represented by an equivalent beamforming weight and may be defined as shown in Equation 6 below.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \text{[Equation 6]}$$

$$w^j_{N_t^{RF}} = \begin{bmatrix} w^j_1 \\ w^j_2 \\ w^j_3 \\ w^j_4 \end{bmatrix}$$

At this time, an arbitrary rank-1 weight vector applied in a digital beamforming stage may be defined as shown in Equation 7 below.

$$F^{BB} = v_1 = [v_1 v_2 v_3 v_4]^T \quad \text{[Equation 7]}$$

An antenna array response vector, to which analog beamforming of Equation 6 and digital beamforming of Equation 7 are applied, may be expressed by Equation 8 below. At this time, assume that the distance between the antennas is $d=\lambda/2$. Each antenna array response vector may be expressed by a sum of all vector elements.

$$\sum a(\theta) = \sum_{i=0}^{15} a_i(\theta) = \quad \text{[Equation 8]}$$

$$(1 \cdot w_1^1 + \exp(j\pi \times \sin(\theta)) \cdot w_1^2 + \exp(j\pi 2 \times \sin(\theta)) \cdot w_1^3 +$$

$$\exp(j\pi 3 \times \sin(\theta)) \cdot w_1^4) \times v_1 +$$

$$(\exp(j\pi 4 \times \sin(\theta)) \cdot w_2^1 + \exp(j\pi 5 \times \sin(\theta)) \cdot w_2^2 +$$

-continued $$\exp(j\pi 6 \times \sin(\theta)) \cdot w_2^3 + \exp(j\pi 7 \times \sin(\theta)) \cdot w_2^4) \times$$
$$v_2 + (\exp(j\pi 8 \times \sin(\theta)) \cdot w_3^1 + \exp(j\pi 9 \times \sin(\theta)) \cdot w_3^2 +$$
$$\exp(j\pi 10 \times \sin(\theta)) \cdot w_3^3 + \exp(j\pi 11 \times \sin(\theta)) \cdot w_3^4) \times$$
$$v_3 + (\exp(j\pi 12 \times \sin(\theta)) \cdot w_4^1 + \exp(j\pi 13 \times \sin(\theta)) \cdot w_4^2 +$$
$$\exp(j\pi 14 \times \sin(\theta)) \cdot w_4^3 +$$
$$\exp(j\pi 15 \times \sin(\theta)) \cdot w_4^4) \times v_4$$

At this time, an analog beamforming weight may be set as shown in Equation 9 below. This is an analog beamforming weight setting method which is generally applied in order to set boresight through analog beamforming.

$$w_1^1 = \begin{bmatrix} 1 \\ e^{-j\pi\sin(\phi)} \\ e^{-j\pi 2\sin(\phi)} \\ e^{-j\pi 3\sin(\phi)} \end{bmatrix}, \quad \text{[Equation 9]}$$

$$w_2^1 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix},$$

$$w_3^1 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\phi)} \end{bmatrix} = e^{j\pi 8\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix},$$

$$w_4^1 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix}$$

If Equation 8 is simplified using Equation 9, Equation 10 below can be obtained.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4) \quad \text{[Equation 10]}$$

Equation 11 below is obtained by generalizing Equation 10.

$$\sum a(\theta) = (1 + \exp(j\pi[\sin(\theta) - \sin(\phi)]) + \quad \text{[Equation 11]}$$
$$\ldots + \exp(j\pi(N_t^{RF} - 1) \cdot [\sin(\theta) - \sin(\phi)])) \times$$
$$(v_1 + \exp(j\pi \cdot (N_t^{RF}) \cdot [\sin(\theta) - \sin(\phi)]) \cdot v_2 + \ldots +$$
$$\exp(j\pi \cdot [N_t^{RF} \cdot (N_{RF} - 1)] \cdot [\sin(\theta) - \sin(\phi)]) \cdot$$
$$v_{N_{RF}}) = \left(\sum_{i=1}^{N_t^{RF}} s_i\right) \times \left(\sum_{i=1}^{N_{RF}} t_i\right) = \sum s \times \sum t$$

where, $\phi$ denotes a degree for determining analog beamforming. For example, if $\phi=30°$ or $\pi/6$ is set, a beamforming direction having maximum beam gain at $\theta=30°$ or $\pi/6$ is set.

Figure 6:
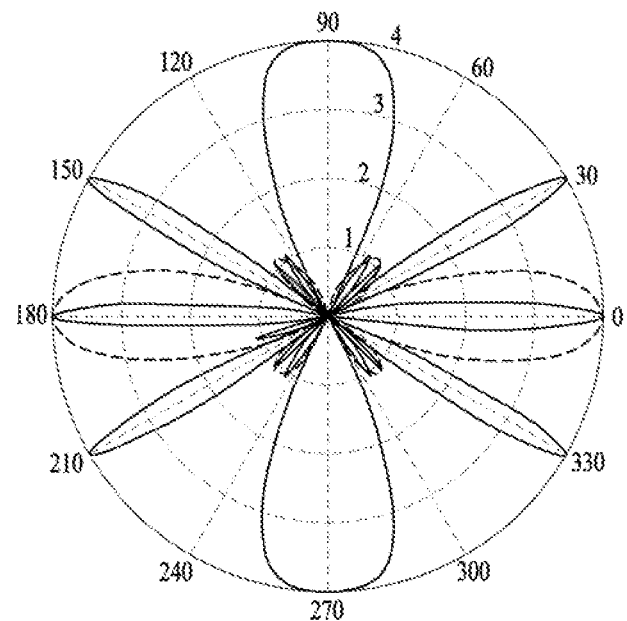
FIG. 6 is a diagram showing an example of a beam pattern of a beam bound vector and a beam steering vector.
Figure 7:
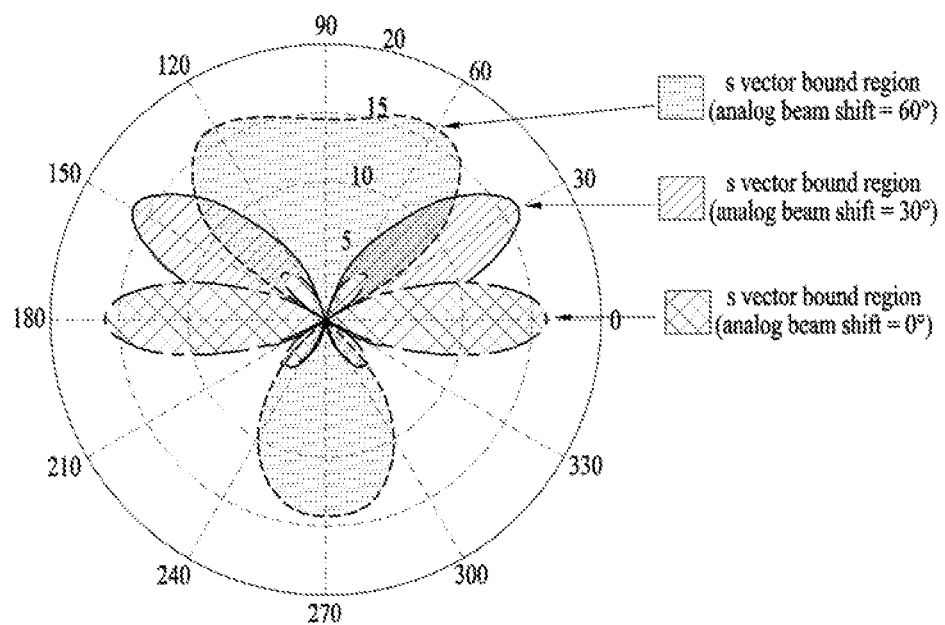
FIG. 7 is a diagram showing a final antenna array response according to analog beam shift.

In addition, a beam bound vector S determines an entire valid range and a digital beamforming range is restricted to a corresponding region. FIG. 6 is a diagram showing an example of a beam pattern of a beam bound vector and a beam steering vector. FIG. 7 is a diagram showing a final antenna array response according to analog beam shift.

Referring to FIG. 6, the beam bound vector s is denoted by a dotted line and beam gain and a beam steering vector t are denoted by a solid line. Finally, a cumulative beam pattern result of applying all vectors $v_1=[v_1 \ v_2 \ v_3 \ v_4]^T$ for determining digital beamforming is shown in FIG. 7. That is, it can be seen that a valid beam range is restricted to the beam bound vector s.

1.5 Digital Beam Coefficient Setting Method Considering Analog Beam Coefficient

As described above, a beam pattern of hybrid beamforming is represented by the total number $N_{RF}$ of RF chains and the number $N_t^{RF}$ of analog antennas per RF chain as shown in Equation 11. Here, the weight vector of a digital beamforming coefficient has a length of $1 \times N_{RF}$. Here, a final beam direction is a combination of an analog beam weight and a digital beam weight. Problems which may occur upon applying digital beamforming without pre-compensating for analog beamforming will now be described. In addition, hereinafter, for convenience of description, a description will be given based on Equation 10 ($N_t=16$, $N_t^{RF}=4$, $N_{RF}=4$)). At this time, the digital beamforming weight $v=[v_1 \ v_2 \ v_3 \ v_4]^T$ of Equation 10 may be designed as shown in Equation 12 below.

$$v = \begin{bmatrix} v_1 \\ v_2 \\ v_3 \\ v_4 \end{bmatrix} = \begin{bmatrix} 1 \\ e^{-j\pi 4\sin(\psi)} \\ e^{-j\pi 8\sin(\psi)} \\ e^{-j\pi 12\sin(\psi)} \end{bmatrix} \quad \text{[Equation 12]}$$

Equation 13 below may be obtained by generalizing Equation 12.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot \sin(\psi)} \\ \vdots \\ e^{-j\pi \cdot N_t^{RF} \cdot (N_{RF}-1) \cdot \sin(\psi)} \end{bmatrix} \quad \text{[Equation 13]}$$

In Equation 12 and 13, a final array response vector considering a digital beamforming angle $\psi$ may be defined as shown in Equation 14 below.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times \{(1 + \exp(j\pi 4[\sin(\theta) - \sin(\phi) - \sin(\psi)]) + \exp(j\pi 8[\sin(\theta) - \sin(\phi) - \sin(\psi)]) + \exp(j\pi 12[\sin(\theta) - \sin(\phi) - \sin(\psi)]))\} \quad \text{[Equation 14]}$$

In Equation 14, [sin ($\theta$)−sin ($\phi$)−sin ($\psi$)] between brackets determines a final beamforming angle. That is, by adjusting sin($\phi$) through analog beamforming and controlling sin($\psi$) through digital beamforming, sin($\theta$) having maximum beam gain is finally adjusted. At this time, if boresight is set to $\phi=30°$ through analog beamforming and $\psi=5°$ is set through digital beamforming for fine tuning, Equation 14 is finally changed to Equation 15.

$$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp$$

$$(j\pi 4[\sin(\theta)-\sin(30°)-\sin(5°)])+\exp(j\pi 8[\sin(\theta)-\sin(30°)-\sin(5°)])+\exp(j\pi 12[\sin(\theta)-\sin(30°)-\sin(5°)])) \quad \text{[Equation 15]}$$

As a result, an angle having maximum beam gain is θ satisfying sin(θ)−sin(30°)−sin(5°)=0. That is, in beamforming, assume that the beam may be finally shifted by 35° shifting the beam by 30° through analog beamforming and shifting the beam by 5° through digital beamforming. However, θ satisfying sin(θ)−sin(30°)−sin(5°)=0 is not accurately 35°. That is, a relationship of θ≈φ+ψ is approximately satisfied. However, in this case, as a beam control range by analog/digital beamforming increases, since a beamforming setting angle satisfying sin(θ)=sin(φ)+sin(ψ) has a relationship of θ≠φ+ψ, the above assumption is no longer valid.

Accordingly, the present invention provides methods of accurately performing beam control by performing pre-compensation with respect to analog beamforming upon performing digital beamforming. That is, a digital beamforming coefficient may be set based on Equation 16 below.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi)-\sin(\phi+\psi))} \\ \vdots \\ e^{j\pi \cdot N_t^{RF} \cdot (N_{RF}-1) \cdot \sin(\phi)-\sin(\phi+\psi))} \end{bmatrix} = \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

$$= \begin{bmatrix} 1 \\ e^{-j\pi \cdot N_t^{RF} \cdot 1 \cdot \sin(\phi)} \\ \vdots \\ e^{-j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix} \quad \text{[Equation 16]}$$

⊕: Hadamard product

In Equation 16, $$\begin{bmatrix} 1 \\ e^{j\pi \cdot N_t^{RF} \cdot 1 \cdot \sin(\phi)} \\ \vdots \\ e^{-j\pi \cdot N_t^{RF} \cdot (N_{RF}-1) \cdot \sin(\phi)} \end{bmatrix}$$

serves to pre-compensate for the analog beam and $$\begin{bmatrix} 1 \\ e^{j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

corresponds to a final digital beam.

A method of setting a final direction of a digital beam will now be described. For example, in an environment of $N_t=16$, $N_t^{RF}=4$, $N_{RF}=4$, in order to rotate all beams by φ=30° through analog beamforming and further rotate the beams by ψ=5° through digital beamforming to set a final beam direction to 35°, a method of designing a digital beamforming coefficient may be defined as shown in Equation 17 below.

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} = \quad \text{[Equation 17]}$$

$$\begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

A final antenna array response vector obtained by applying the digital coefficient of Equation 16 to Equation 10 may be defined as shown in Equation 18 below.

$$\sum a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4) = \quad \text{[Equation 18]}$$

$$(1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (1 + \exp(j\pi 4[\sin(\theta) - \sin(\phi) + \sin(\phi) - \sin(\phi+\psi)]) + \exp(j\pi 8[\sin(\theta) - \sin(\phi) + \sin(\phi) - \sin(\phi+\psi)]) + \exp(j\pi 12[\sin(\theta) - \sin(\phi) + \sin(\phi) - \sin(\phi+\psi)] = (1 + \exp(j\pi[\sin(\theta) - \sin(\phi)]) + \exp(j 2\pi[\sin(\theta) - \sin(\phi)]) + \exp(j\pi 3[\sin(\theta) - \sin(\phi)])) \times (1 + \exp(j\pi 4[\sin(\theta) - \sin\phi + (\psi)]) + \exp(j\pi 8[\sin(\theta) - \sin(\phi + \psi)]) + \exp(j\pi 12[\sin(\theta) - \sin(\phi + \psi)]))$$

In Equation 18, in the case of φ=30°, if a final beamforming rotation angle is set to 35° by applying ψ+5°, Equation 19 is obtained.

$$\Sigma a(\theta)=(1+\exp(j\pi[\sin(\theta)-\sin(30°)])+\exp(j\pi 2[\sin(\theta)-\sin(30°)])+\exp(j\pi 3[\sin(\theta)-\sin(30°)]))\times 1+\exp(j\pi 4[\sin(\theta)-\sin(35°)])+\exp(j\pi 8[\sin(\theta)-\sin(35°)])+\exp(j+12[\sin(\theta)-\sin(35°)])) \quad \text{[Equation 19]}$$

Figure 8:
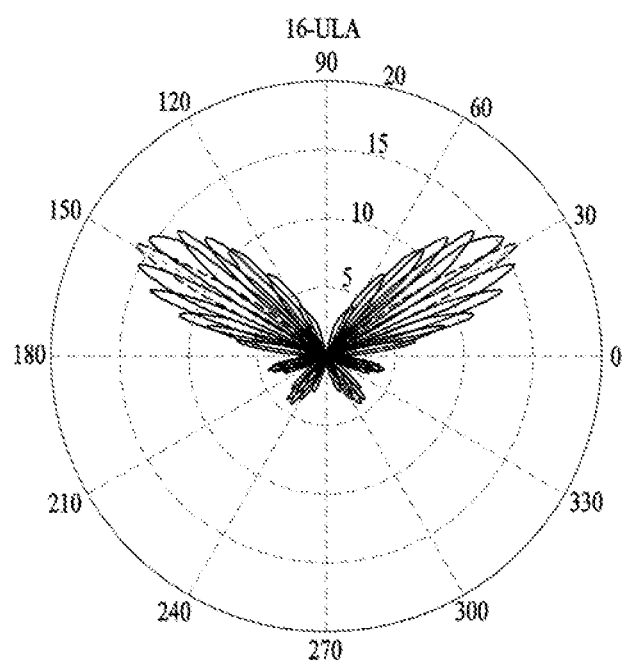
FIG. 8 is a diagram showing an antenna array response, to which digital beamforming coefficient design is applied.

If digital beamforming is performed with respect to Ψ±5°, ±10°, ±15°, the beam shape of the final antenna array response vector shown in FIG. 8 is obtained. FIG. 8 is a diagram showing an antenna array response, to which digital beamforming coefficient design is applied.

Referring to the result shown in FIG. 8, accurate beam control of the hybrid beamformer is possible through such a digital beamforming coefficient design method.

2. Preamble for Hybrid Beamforming

In the embodiments of the present invention, an analog beam scanning method through association between a training section for analog beam estimation and a broadcast channel (BCH) in hybrid beamforming is proposed. In addition, as another embodiment, a synchronization estimation method using a training section is proposed. In the embodiments of the present invention, the training section means a section in which a preamble is transmitted.

2.1 Method of Allocating Training Symbol Section for Analog Beam in Association with Broadcast Channel Hereinafter, a method of allocating a training symbol section for analog beam estimation will be described. In the embodiments of the present invention, a training symbol for analog beam estimation may be allocated adjacent to a broadcast channel and the broadcast channel may be repeatedly transmitted by the number of analog candidate beams.

2.1.1 Location of Training Symbol Section Associated with PBCH

Figure 9:
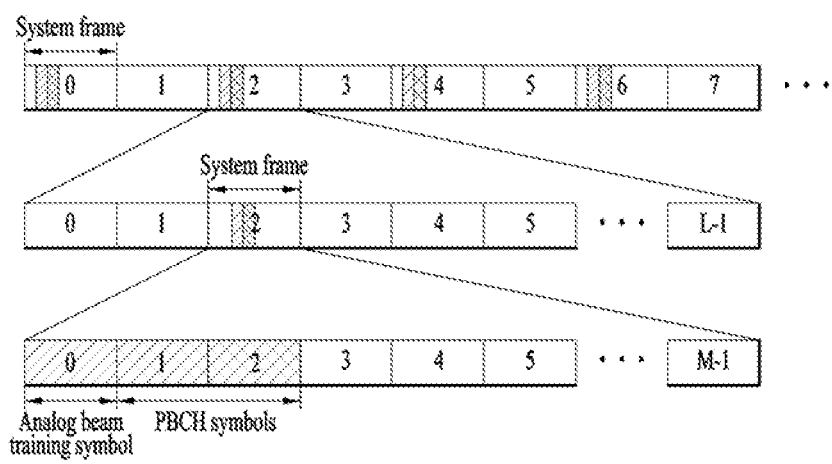
FIG. 9 is a diagram illustrating a method of allocating a training symbol section for an analog beam.
Figure 9:
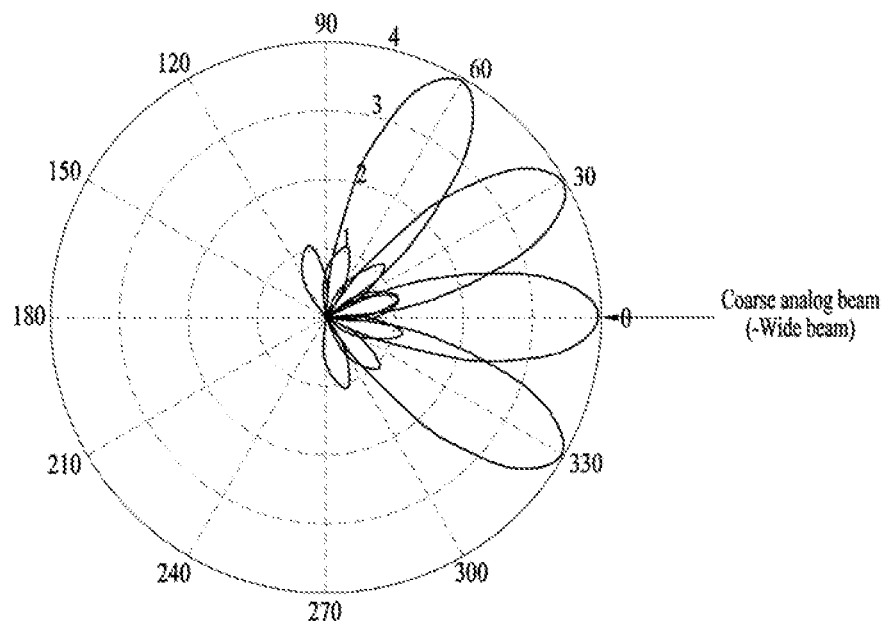

FIG. 9 is a diagram illustrating a method of allocating a training symbol section for an analog beam.

The structure of a subframe shown in FIG. 9 is basically based on frame structure type 1 or 2 defined in an LTE/LTE-A system. That is, one subframe includes two slots and each slot includes six or seven OFDM symbols. Each subframe may be composed of a transmission time interval (TTI) of 1 ms.

In the embodiments of the present invention, a training symbol section for analog beam estimation means a section to which one or more training symbols are allocated. The training symbol may be composed of a preamble, a reference signal or a pilot symbol.

Although four analog beam candidates are shown in FIG. 9, the number of analog beam candidates may be N (arbitrary positive integer).

In FIG. 9(a), assume that the number of training symbol sections for analog beam estimation is equal to the number of coarse analog beams. For example, as shown in FIG. 9(b), if it is assumed that the total number of analog beams is 4, a total of four training symbol sections is allocated for analog beam training. In addition, broadcast channels (PBCHs) are allocated adjacent to the training symbol sections and are transmitted using the same analog beamforming. The number of times of repeatedly transmitting the broadcast channel is equal to at least the number of coarse analog beams in order to transmit the same system information in all directions in service coverage. In FIG. 9(a), the broadcast channel is transmitted at a period of 20 ms and the broadcast channel (physical broadcast channel (PBCH)) including the same broadcast information may be repeatedly transmitted four times.

As shown in FIG. 9(b), the coarse analog candidate beams may have different transmission angles and the repeatedly transmitted training symbols may be mapped to analog beams having different angles.

Figure 10:
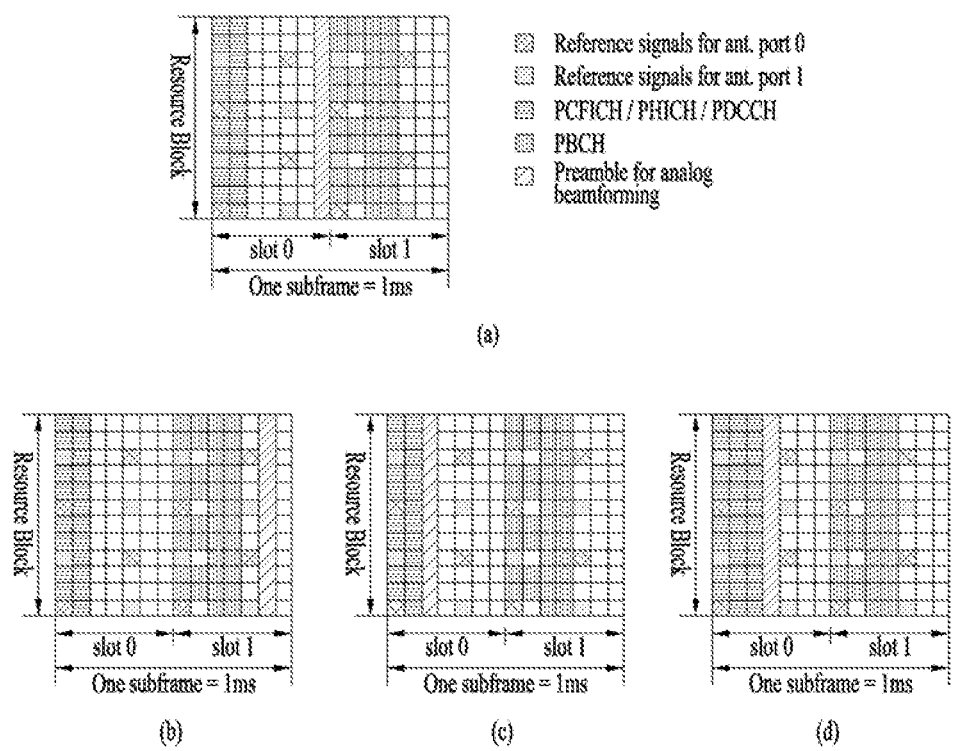
FIG. 10 is a diagram illustrating a method of allocating a training symbol section in association with a PBCH.

FIG. 10 is a diagram illustrating a method of allocating a training symbol section in association with a PBCH.

FIG. 10(a) shows an example of allocating a training symbol section just before a PBCH allocation region. A symbol located before the PBCH is not a region, to which a cell-specific reference signal (CRS) is allocated, and thus may be defined as a training symbol section for analog beam scanning with respect to the entire frequency band.

In FIG. 10(a), the training symbol section may be allocated to the region located just before the PBCH allocation region such that the training symbol may be transmitted without being restricted to a control region (PCFICH/PHICH/PDCCH transmission region) and a CRS transmission region. That is, since the training symbol for analog beam scanning may be transmitted in the entire frequency band, a probability of a UE detecting the training symbol may be significantly increased.

FIG. 10(b) shows an example of allocating a training symbol section after a PBCH allocation region. A symbol located just after a PBCH is allocated a CRS and thus may not be suitable as a region to which a training symbol section is allocated. Accordingly, a symbol closest to the PBCH allocation region among symbols, to which the CRS is not allocated, after the PBCH allocation region may be set as a training symbol section. FIG. 10(b) shows a subframe in which a training symbol section for analog beam scanning is allocated to a symbol spaced apart from the PBCH allocation symbol by one symbol.

FIG. 10(c) and FIG. 10(d) are diagrams illustrating a method of allocating a training symbol section to a subframe, to which a PBCH is allocated, to be spaced apart from the PBCH by a predetermined spacing.

A training symbol section for analog beam scanning may be allocated adjacent to a control region (that is, a PDCCH allocation region) located before the PBCH. However, at this time, the training symbol section may be flexibly allocated according to the range of the PDCCH. The control region, to which the PDCCH is allocated, may be allocated to a maximum of three OFDM symbols. If two or fewer symbols are defined as a control region, a training symbol section may be set as shown in FIG. 10(d).

The size of the control region, to which the PDCCH is allocated, is determined by a physical control format indicator channel (PCFICH). FIG. 10(c) shows a training symbol section allocated to a symbol located just after a control region (that is, OFDM symbol index #2) in a subframe in which a PBCH is transmitted, when a PCFICH is set to 2. FIG. 10(d) shows a training symbol section allocated to a symbol located just after a control region (that is, OFDM symbol index #3) in a subframe in which a PBCH is transmitted when a PCFICH is set to 3.

In FIG. 10, a preamble for analog beamforming means a training symbol transmitted in a training symbol section, which may also be referred to as a reference signal or a pilot signal.

2.1.2 Allocation Period of Training Symbol Section Associated with PBCH

The allocation period of the training symbol section may be set to the number N of analog candidate beams. Update of broadcast information transmitted through the broadcast channel may be performed in proportion to the number N of analog candidate beams.

In the present embodiment, broadcast information (that is, system information) transmitted through the broadcast channel may be updated at a period corresponding to the number of coarse analog beams. Through this, a UE may perform BCH acquisition and update in correspondence with the training symbol section, to which analog beamforming is applied. In addition, each UE may acquire a PBCH with the same beam directivity within analog beamforming coverage.

Figure 11:
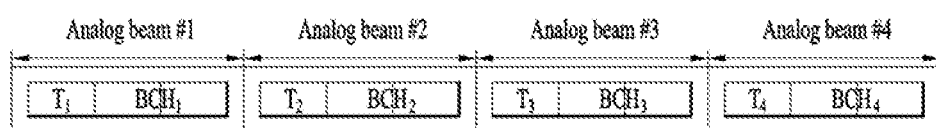
FIG. 11 is a diagram illustrating a method of configuring an analog beamforming-based broadcast channel.

That is, the PBCH has a structure in which the same information is repeated within the same coarse analog beam training symbol period, which will be described with reference to FIG. 11. FIG. 11 is a diagram illustrating a method of configuring an analog beamforming-based broadcast channel.

In FIG. 11, the number of analog beam candidates is 4 and training symbol sections and broadcast channels may be allocated. At this time, upon transmitting training symbols T1 to T4, system information transmitted through BCH1 and system information transmitted through BCH2, BCH3 and BCH4 are identical but are transmitted using different analog beamforming.

In the training symbol section of FIG. 11, the UE may acquire different analog beam information through correlation detection using a predetermined sequence as shown in Equation 20 below.

$$E = \underset{i \in \{1,2,3,\ldots,I\}}{\operatorname{argmax}} \left( \sum_{n=0}^{N-1} r_n^* s_n^i \right)$$ [Equation 20]

N: Sequence length or FFT size
I: No. of coarse analog beams or analog beam IDs

In Equation 20, $r_n$ denotes data received by the UE (that is, a training symbol, to which an analog beam is applied). In Equation 20, N means the length of the sequence to be correlated in order to detect the analog beam and I (i=1, 2, 3, ..., I) means the number of analog beams or the number of analog beam IDs.

At this time, the UE performs correlation using a first sequence $s_n^1$ in order to detect the analog beam in a first training symbol section. In this manner, the UE may be configured to repeatedly perform the analog beam detection process in second, third and fourth training symbol sections.

In addition, since the BCH located adjacent to the training symbol section, to which analog beamforming is applied, is transmitted using the same analog beamforming, the BCH may also be transmitted to UEs in a cell and updated in the same units as the coarse analog beam scanning step.

2.1.3 Method of Scrambling Broadcast Channel

In the embodiment of the present invention, the broadcast channel may be scrambled using analog beam information. A UE, which has detected a training symbol, may detect broadcast channel information using analog beam detection information.

For example, assume that channel coding is applied to a broadcast channel and a total number of data bits of a broadcast channel subjected to CRC processing, is M. At this time, if analog beam information (e.g., an identifier) applied to a training symbol section $T_i$ is defined as $N_{ID}^{beam}$, broadcast information (that is, data of the BCH) transmitted through the broadcast channel may be scrambled as shown in Equation 21 below.

$$\tilde{b}(i) = (b(i) + c(i)) \bmod 2$$ [Equation 21]

i=0, 1, 2, ..., ($M_{bit}$−1)
c(i): scrambling sequence

In Equation 21, an initialization value $c_{init}$ for generating a scrambling sequence c(i) may be determined by a function defined based on an analog beam identifier value as shown in Equation 22 below.

$$c_{init} = f(N_{ID}^{beam}, N_{ID}^{cell}, \ldots)$$ [Equation 22]

In Equation 22, $N_{ID}^{cell}$ denotes the identifier of a serving cell in which an analog beam or a broadcast channel is transmitted.

Figure 12:
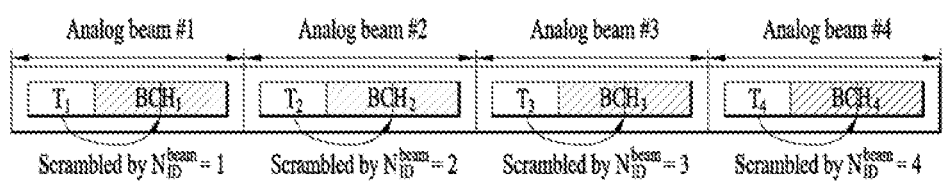
FIG. 12 is a diagram illustrating a method of applying scrambling to a broadcast channel based on analog beam information.

FIG. 12 is a diagram illustrating a method of applying scrambling to a broadcast channel based on analog beam information.

Through such a process, analog beam information may be acquired and, at the same time, system information may be acquired through a BCH. It is assumed that, if system information is not acquired through the BCH, analog beam information is not acquired either. A method of applying a scrambling sequence is applicable to functions and processing methods other than the methods disclosed in the present invention.

2.2 Method of Detecting Synchronization Using Repetition Pattern of Training Symbol Section Hereinafter, the below-described embodiments of the present invention relate to a method of, at a UE, detecting synchronization with an eNB in addition to analog beam detection using a time-axis repetition pattern of a training symbol section.

A UE, which was not initially synchronized, may acquire basic synchronization with an eNB using the properties of the above-described training symbol section and use the training symbol section for analog beam training thereafter.

Hereinafter, methods of, at a UE, acquiring a downlink synchronization signal in a training symbol section T1 for an analog beam (see FIG. 11 or 12) will be described.

2.2.1 Synchronization Detection Using Repetition Pattern in which Training Symbol is Transmitted In the below-described embodiments, methods of using some subcarriers located in a middle part of the frequency domain without allocating a sequence to an entire frequency domain in a training symbol section will be described.

For example, since a null subcarrier or a zero subcarrier (or a zero bit) is inserted in a state of fixing a subcarrier spacing in the frequency domain, the same training signal is repeated in the time domain. The waveform of the same training signal may be repeated according to the number of zero subcarriers inserted in the same OFDM symbol period.

Figure 13:
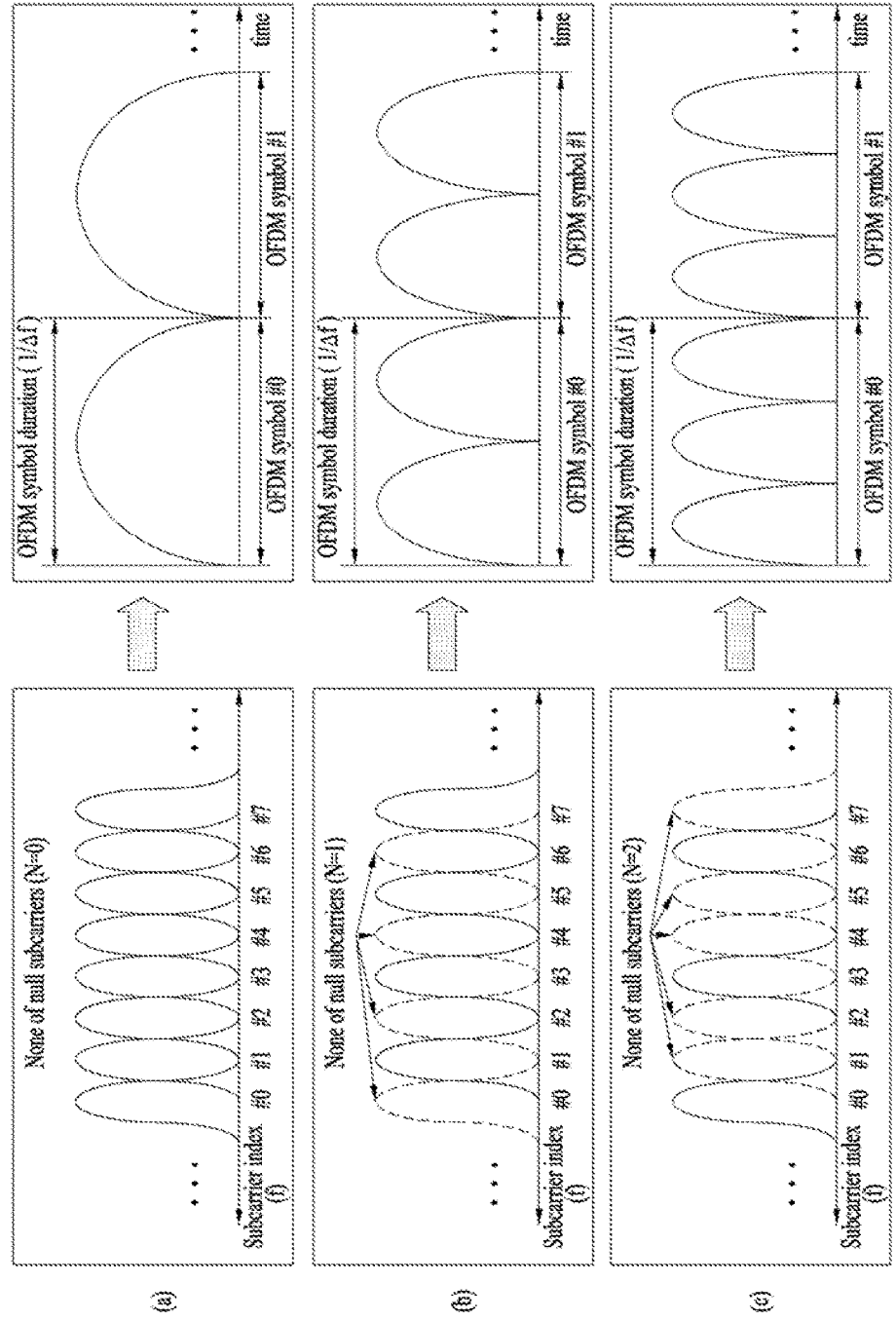
FIG. 13 is a diagram showing a state in which an OFDM signal is repeated in a time domain by inserting a null (zero) subcarrier in a frequency domain.

FIG. 13 is a diagram showing a state in which an OFDM signal is repeated in the time domain by inserting a null (zero) subcarrier in the frequency domain. The left side of FIG. 13 shows original subcarriers and the right side of FIG. 13 shows the waveform of a training signal repeated upon inserting null subcarriers.

Referring to FIG. 13, the same signal is repeated (N+1) times within the OFDM symbol period of the same time domain according to the number N of null subcarriers inserted between subcarriers, to which actual sequence data is allocated. The subcarrier spacing Δf may not be changed and a sample may be used without changing a period $T_s$ and a sampling frequency $f_s$.

At this time, if only one null subcarrier is inserted in the frequency domain, the same signal is repeated twice in the same symbol section as shown in FIG. 13(b). Accordingly, the UE may acquire synchronization as shown in Equation 23 below.

$$E = \sum_{m=0}^{N_{FFT}-1} r_m r_{m+N_{FFT}/2}^*$$ [Equation 23]

$|E|^2 \geq$ Threshold

There is a symbol having the same symbol duration as an FFT size. At this time, a location where a value thereof is maximized may be estimated using the characteristics of a signal repeated in the same symbol duration. A reference value may be determined in consideration of system structure and sequence design.

2.2.2 Method of Transmitting Analog Beam Width Information Using Repetition Pattern of Training Symbol Section The below-described embodiments relate to a method of transmitting analog beam width information using a time-domain repetition pattern of a sequence per preamble (training symbol) for analog beam estimation.

In hybrid beamforming, the beam width of an analog beam pattern may be determined according to the number of physical antennas coupled per radio frequency (RF) chain. Accordingly, an eNB may implicitly transmit such analog beam pattern information to the UE using a repetition pattern in the time domain of a training symbol section. The UE may acquire configuration information of the training symbol section and/or transmission width information of an analog beam.

FIG. 14 is a diagram illustrating a relation between a training sequence repetition pattern and an analog beam pattern. That is, FIG. 14 shows the pattern of the analog beam configured as shown in Table 2 below.

TABLE 2

| Number of repetitions (times) | Coarse analog beam width | Training symbol period (or number of training symbols) |
|---|---|---|
| 1 | Wide | 1 symbol |
| 2 | Middle | 2 symbols |
| 3 | narrow | 4 symbols |
| ... | | |

Referring to Table 2 and FIG. 14, if the training sequence is not repeated, the training symbol or the training symbol period is set to 1. In this case, the coarse analog beam has the widest beam width. If the training sequence is repeated predetermined times, the training symbol or the training symbol period is set according to the number of repetitions (see Table 2). At this time, as the number of repetitions of the training sequence increases, the beam width of the coarse analog beam may decrease.

That is, as the beam width of the analog beam decreases, more analog candidate beams may be configured. Therefore, it is preferable that the training symbol section is increased.

Although the above-described embodiments of the present invention are described based on the hybrid beamforming structure, as shown in FIG. 5, the embodiments are applicable to the case where the analog beamforming stage is replaced with a digital beamforming stage. That is, this technology is applicable to a digital beamforming structure having a hierarchical structure through antenna sub-grouping.

In addition, although the embodiments of the present invention are described based on a downlink scenario in which an eNB transmits a signal to a UE, the embodiments of the present invention are applicable to an arbitrary combination of a transmitter and a receiver. For example, the embodiments of the present invention are applicable to an uplink transmission scenario in which a UE transmits a signal to an eNB, a UE-to-UE signal transmission scenario (D2D, V2V, etc.) or an eNB-to-eNB signal transmission scenario (relay, wireless backhaul, etc.).

3. Apparatus

Figure 15:
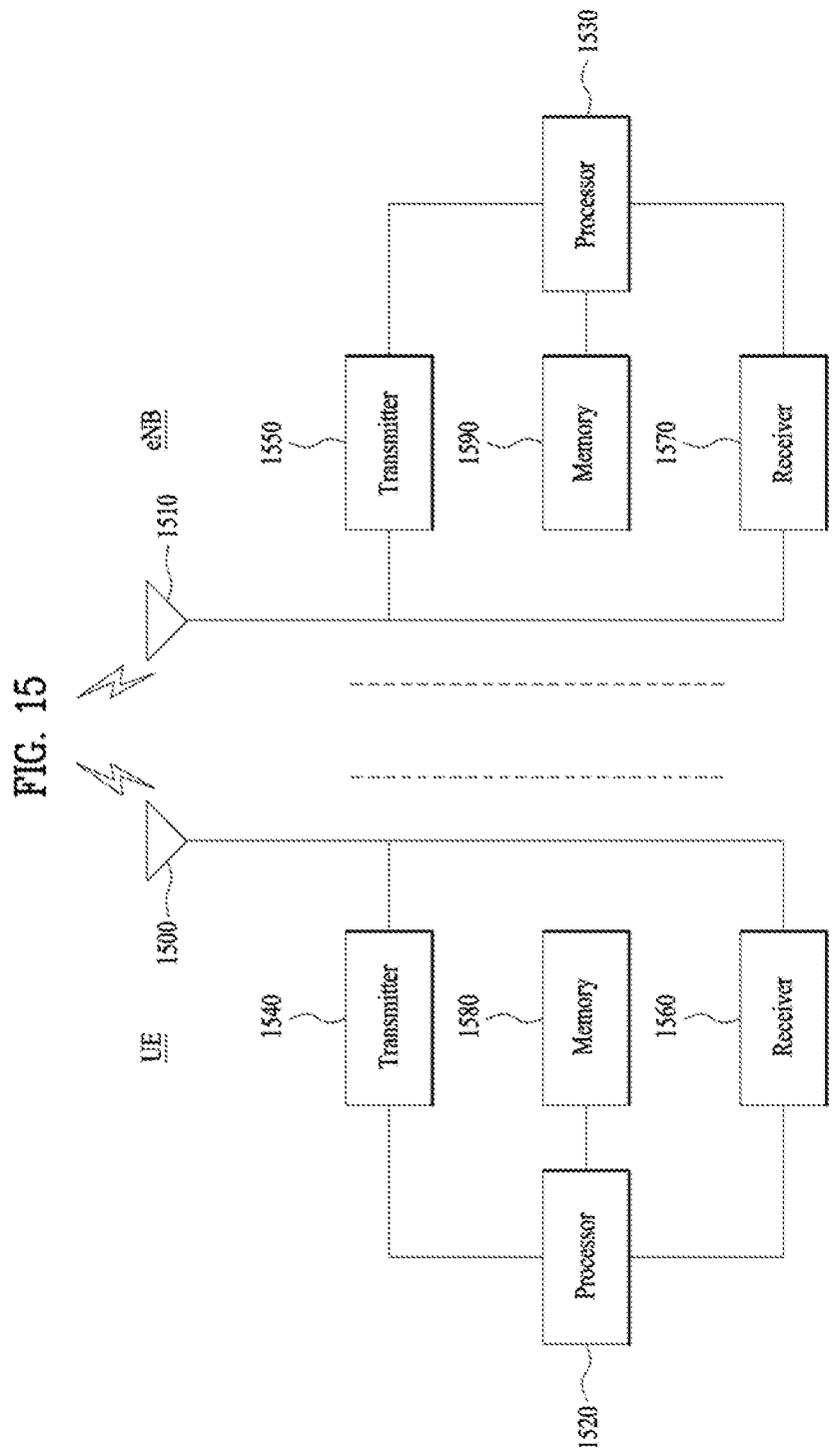
FIG. 15 is a diagram showing an apparatus for implementing the methods described with reference to FIGS. 1 to 14.

Apparatuses illustrated in FIG. 15 are means that can implement the methods described before with reference to FIGS. 1 to 14.

A UE may act as a transmission end on a UL and as a reception end on a DL. An eNB may act as a reception end on a UL and as a transmission end on a DL.

That is, each of the UE and the eNB may include a transmitter 1540 or 1550 and a receiver 1560 or 1570, for controlling transmission and reception of information, data, and/or messages, and an antenna 1500 or 1510 for transmitting and receiving information, data, and/or messages.

Each of the UE and the eNB may further include a processor 1520 or 1530 for implementing the afore-described embodiments of the present disclosure and a memory 1580 or 1590 for temporarily or permanently storing operations of the processor 1520 or 1530.

The embodiments of the present invention may be implemented using the components and functions of the UE and the eNB. In addition, each of the processors of the UE and the eNB may include an analog beamformer supporting analog beamforming and a digital beamformer supporting digital beamforming. Accordingly, the processor of the UE or the eNB may combine the methods described in Chapters 1 to 2 to apply a hybrid beamforming method for supporting multi-rank. For a detailed description thereof, refer to Chapters 1 and 2.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1580 or 1590 and executed by the processor 1520 or 1530. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method of transmitting a training signal and system information by a transmitting device in a radio access system supporting hybrid beamforming, the method comprising:
    transmitting a training signal related to an X-th analog beam via a first orthogonal frequency division multiplexing (OFDM) symbol based on the X-th analog beam,
    wherein the X-th analog beam is one of N analog candidate beams, and
    wherein X and N are natural numbers; and
    transmitting system information via second OFDM symbols based on the X-th analog beam,
    wherein the transmissions of the training signal and the system information are performed N times,
    wherein each of the N times transmissions is performed based on each of the N analog candidate beams,
    wherein the first OFDM symbol is allocated after the second OFDM symbols in a subframe, and
    wherein the first OFDM symbol is different from a third OFDM symbol used for transmission of cell-specific reference signals.

2. The method according to claim 1, wherein the transmitted system information based on each of the N analog candidate beams are same.

3. The method according to claim 1, wherein a beam width of the X-th analog beam is set based on a repetition pattern of training sequences for the X-th analog beam transmitted via the first OFDM symbol in a time domain.

4. The method according to claim 3, wherein as a number of repetition of the training sequences for the X-th analog beam transmitted via the first OFDM symbol is bigger, the beam width of the X-th analog beam is smaller.

5. The method according to claim 1, wherein the training signal related to the X-th analog beam is used for estimating the X-th analog beam.

6. The method according to claim 1, wherein the training signal related to the X-th analog beam transmitted based on the X-th analog beam is transmitted using the X-th analog beam.

7. An apparatus for transmitting a training signal and system information in a radio access system supporting hybrid beamforming, the apparatus comprising:
    a transmitter; and
    a processor configured to:
        control the transmitter to transmit a training signal related to an X-th analog beam via a first orthogonal frequency division multiplexing (OFDM) symbol based on the X-th analog beam,
        wherein the X-th analog beam is one of N analog candidate beams, wherein X and N are natural numbers, and
        control the transmitter to transmit system information via second OFDM symbols based on the X-th analog beam,
        wherein the transmissions of the training signal and the system information are performed N times,
        wherein each of the N times transmissions is performed based on each of the N analog candidate beams,
        wherein the first OFDM symbol is allocated after the second OFDM symbols in a subframe, and
        wherein the first OFDM symbol is different from a third OFDM symbol used for transmission of cell-specific reference signals.

8. The apparatus according to claim 7, wherein the transmitted system information based on each of the N analog candidate beams are same.

9. The apparatus according to claim 7, wherein a beam width of the X-th analog beam is set based on a repetition pattern of training sequences for the X-th analog beam transmitted via the first OFDM symbol in the time domain.

10. The apparatus according to claim 9, wherein as a number of repetition of the training sequences for the X-th analog beam transmitted via the first OFDM symbol is bigger, the beam width of the X-th analog beam is smaller.

11. The apparatus according to claim 9, wherein the training signal related to the X-th analog beam is used for estimating the X-th analog beam.

12. The apparatus according to claim 9, wherein the training signal related to the X-th analog beam transmitted based on the X-th analog beam is transmitted using the X-th analog beam.

* * * * *